United States Patent [19]
Desarzens

[11] 3,730,167
[45] May 1, 1973

[54] NON BOIL-OVER COOKING ASSEMBLY

[76] Inventor: Dominique Patrice Desarzens, 89 Rameau Drive, Unit 7, Willowdale, Ontario, Canada

[22] Filed: Feb. 25, 1971

[21] Appl. No.: 118,711

[52] U.S. Cl. ............................................. 126/386
[51] Int. Cl. .............................................. A47j 27/58
[58] Field of Search ............... 126/377, 383, 386, 126/369; 220/23.83, 23.86

[56] References Cited

UNITED STATES PATENTS

| | | | |
|---|---|---|---|
| 1,468,841 | 9/1923 | Smith | 126/377 |
| 1,334,930 | 3/1920 | Chadwick | 126/377 |

FOREIGN PATENTS OR APPLICATIONS

| | | | |
|---|---|---|---|
| 275,163 | 6/1930 | Italy | 126/386 |

Primary Examiner—Meyer Perlin
Assistant Examiner—William C. Anderson
Attorney—Cecil C. Kent

[57] ABSTRACT

A saucepan is combined with a generally conical safety-funnel detachably secured to the saucepan. The funnel is plastic and an annular in-step is provided at the junction of the saucepan wall and floor for supporting the perimeter of the funnel spaced above the floor and away from direct heat contact. The funnel is reversable and the small end capped to function as a separate hot liquid (or solid) heater within the outer saucepan which can at the same time be cooking something else. A ring of spaced apertures around the big funnel end provides circulating passage between the contents of the interior of the funnel and those in the surrounding saucepan.

7 Claims, 4 Drawing Figures

Patented May 1, 1973 3,730,167

Inventor
Dominique P. Desarzens

By
Acil C. Kent
Attorney

NON BOIL-OVER COOKING ASSEMBLY

FIELD OF THE INVENTION

The invention is an adaptable two-component cooking assembly in the form of an outer open-topped vessel or saucepan of novel configuration and an inner vessel also of novel configuration having open opposite ends, the two vessels coacting to secure detachably the inner vessel centrally in the outer vessel with the inner vessel spaced above the floor of the outer vessel so that, being made of plastic the iner vessel will not be destroyed byaaction from a source of heat playing directly upon the floor of the outer vessel or saucepan.

PRIOR PRACTICES

It is common o heat substances such as milk within saucepans. In the process however they need constantly tobe watched after the milk has reached a certain temperat4re. It is common to provide funnels for diret1ng the passage of food stuffs into a narrow opening and to convey milk as from a saucepan into a nursing bottle. It is also common to cook food stuffs such as vegetables and the like in multi-compartmented contaners so that this may be done over a single heating element, and it is common to emloy, in this connection, vessels of sectorial configuration which may be detachably connected side by side so that the dividing walls radiate from a centre.

THE INVENTED IDEA

Having due regard to all the foregoing, and to the extent to which the invention has been referred to as such already herenn, further inventive objects, considerations and features are as follows:

By the use of the present invention it will no longer be necessary to pay the same degree of attention to mil2 while it is being heated as is ordinarily the case since it will not boil over to the outside of the saucepan. Instead, when bolling, milk will simply be admitted to the interior of the inner vessel and travel outwardly to be discharged outwardly over the reduced upper end thereof to flow over outwardly and downwardly upon the convexly conical surface of the inner vessel to mix again with the body of milk in the saucepan outside the confines of the inner vessel and locking means are provided for detachably securing the inner vessel in place and against rising under the influence of upward pressure of the milk.

A further object is to provide a detachable inner vessel provided with a threaded smaller or reduced open end to which may be secured a bay's nursing bottle so that said inner vessel may function as a funnel after being used in association with the boiling operation aforesaid, be1ng easily detachable from the outer suacepan or vessel for that purpose.

A further object is to provide in association wth a novel outer vessel, an inner vessel having opposite open ends one of which is of considerable diameter relative to the oposite end, the said opposite or reduced end being screw-threaded and hence capable of accepting either an imperforate closure or a screen with which latter the inner vessel may be employed as a straining device for gravy, etc. With the imperforate closure screwed on the inner vessel becomes a convenient culinary receptacle or it can be employed as mould for jellies and the like.

A further object is to provide in the combination disclosed, an inner vessel which, when the imperforate closure aforesaid is attached may be placed within the surrounding saucepan or outer vessel and seured therein with the large diameter end uppermost in which posture it may function as a heater for liquid foods, solid foods such as rice, noodles and the like while another substance may be cooking and transferring heat to the inner vessel, in the outer vessel or saucepan.

A further object is to provide a device of the character herewithin described which is of particularly simple construction as a result of which it should be saleable at an acceptable mass market price 1nd which is simple to use, easy to clean and cannot easily get out of order.

With the foregoing in view, and such other of further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying drawings in which.

In the drawings, like characters of reference indicate similar parts in the several figures.

PRELIMINARY DESCRIPTION

Figure 1:
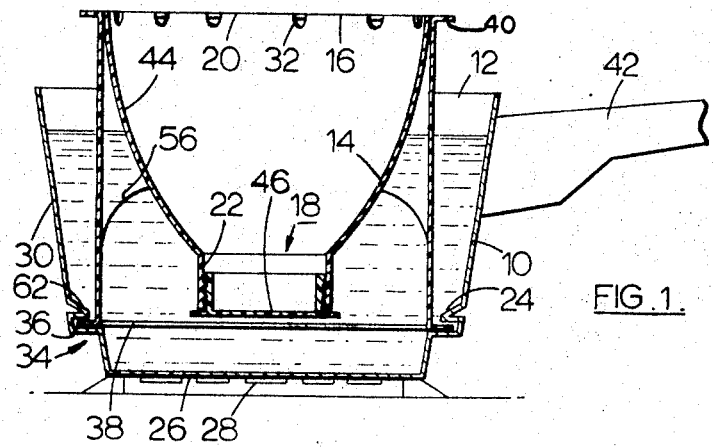
FIG. 1 is a sectional elevation of the present invention depicting the inner vessel in the posture of a separate closed vessel and the closure cap in situ.

Referring summarily to the invention in accordance with the definition thereof as claimed, a non boil-OVER cooking assembly for liquids and particularly ingestible liquids is characterized by at least including, in combination, an outer vessel means 10, open-topped as at 12, and inner vessel means 14 having open opposite ends generally designated 16 and 18 each including a mouth 20 or 22, the mouth of one of said ends being substantially smaller in area than the mouth of the opposite end and means collectively designated 24 for detachably connecting said inner vessel to said outer vessel, with the end (18 in FIG.1) nearest floor 26 substantially spaced from and in a plane above a source of heat 28 below said outer veseel, the outer vessel being also provided with a surrounding wall 30.

The invention also includes the perimetrically disposed aperture means 62, means collectively designated 34 for supporting one end 16 or 18 of inner vessel 14 spaced from he source of heat, consisting of a surrounding in-stepped external recess 34 formed in wall 30 providing an interior land 36 in the outer vessel, the inner vessel 14 having flange means 38 supportable upon said land. More specifically, flange means 38 and further flange means 40 enclose substantially equal areas substantially on the planes of both ends 16 and 18 of inner vessel 14, said detachaby connecting means 24 coacting between flange means 38 or 40 and outer vessel 10 (via the interior land 36 thereof) for locking said inner vessel to said outer vessel.

DETAILED DESCIPTION

Having regard to what has already been described, outer vessel 10 is provided with a conventional handle 42. Inner vessel 14 is predominantly exterio-convexly conical as at 44. The mouth 22 is preferably cylindrial, being internally screw-threaded to receive either the externally screw-threaded imperforate cap 46 whereby the interior of the vessel 14 may be converted into a fluid-tight receptacle, or the screen cap 48, also externally screw-threaded upon the neck 50 thereof by the use of which materials may be strained or shifted through the screen disc 52 thereof.

The outwardly projecting annular flanges 38 and 40 are substantially in the plane of the opposite ends 16 or 18 of inner vessel 14, or in other words substantially on the planes of the opposite extremities thereof. Both flanges are of the same diameter so that they will seat upon the circumscribing land 36 formed in wall 30. This is achieved, with reference to flange 40 by the provision of a plurality of equi-spaced connecting strips 54 extending between flanges 38 and 40 and rigidified by the intervening webs 56.

Figure 4:
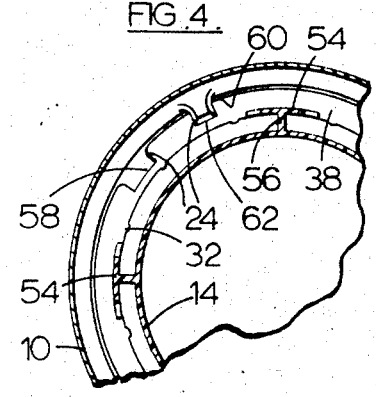
FIG. 4 is a fragmentary plan section substantially on the line 4—4 of FIG. 2.

The flanges 38 and 40 are each provided at diametrically opposite points thereon with a pair of small bays 58 relieved from the outer surrounding edges 60 of the flanges. Projecting inwardly at diametrically opposite points upon wall 30 and slightly spaced above the land 36 is a pair of lugs of any desired form such as punchings, solids, inserts, or the like 62. The width of the elements 62 and the extent of projection of the same is such that the bays 58 may be dropped past them so that the associated flange rests upon land 36. Preferably, though not altogether necessarily, the upper surface portion of the land to one side of each bay should incline upwardly slightly and for a short distance so as to provide means whereby upon the rotation of the inner vessel 14 the associated flange will bear frictionally against the lugs of 62 and effect a binding action of the inner vessel to the outer vessel but one which can readily be released by a slight rotation. It will clearly be recognized from an inspection of FIG. 4 that when the seen flange 38 is rotated slightly such that the bay 58 is misaligned with respect to lug 62, the two vessels will be locked together and by a reverse rotation they may be unlocked.

Figure 2:
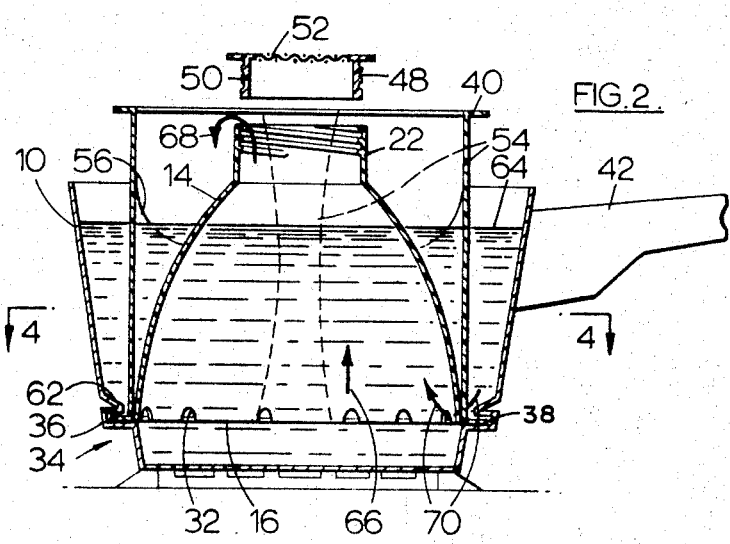
FIG. 2 is a sectional elevation of the invention with the inner vessel in reverse posture to that of FIG. 1 wherein it may function as a ml or the like saeety,non-spill boiler.
Figure 3:
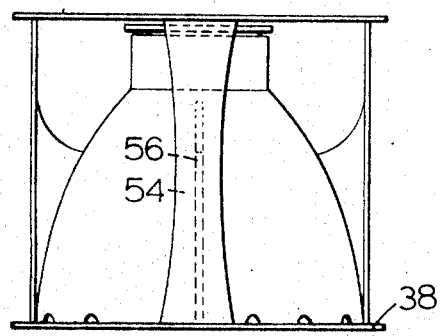
FIG. 3 is a side elevation of the invention substantially as the same seen in section in FIG. 2.

Having regard for all the foregoing it will also by now be abundantly clear that if the inner vessel 14 be of plastic, it is held clear above the heating elements 28. In the posture of FIG. 2 inner vessel 14 will facilitate the heating of fluid body 64 in the manner suggested by the arrangement of arrows shown in FIG. 2. Thus, as the milk is heeated it rises as per arrow 66 within the cone designated by 44 and flows outwardly over mouth 22 (arrow 68) down the outside of inner vessel. It is reintroduced to the interior of the inner vessel through the apertures 32 as indicated by arrow 70. Any tendency of the inner vessel to rise is intercepted by the locking means between the inner and outer vessels which has already been detailed.

Various modifications can be made within the scope of the inventive concept disclosed. Accordingly, it is intended that what is set forth herein should be regarded as illustrative of such concept and not for the purpose of limiting protection to any particular of such concept and not for the purpose of limiting protection to any particular embodiment thereof, and that only such limitations should be placed upon the scope of protection to which the inventor hereof is entitled, as justice dictates.

What is claimed is:

1. A non boil-over cooking assembly for liquids and particularly ingestible liquids characterized by at least includlng, in combination, an outer open-topped vessel means having a floor and surrounding wall, and inner vessel means having opposite ends, each including a mouth, the mouth of one of said ends being substantially smaller in area than the mouth of the opposite end, and means for detachably connecting said inner vessel to said outer vessel, whereby either end of said inner vessel may be held sufficienty spaced so as to lie on a plane above a source of heat below said assembly thereby permitting liquid circulating between said floor and the adjacent end of said vessel to rise within said inner vessel and fall within said outer vessel, and closure means for the smaller of said mouths.

2. The invention according to claim 1 in which said means for supporting one end of said inner vessel spaced from said source of heat consists of surrounding in-stepped external recess formed in said wall near said floor to provide an interior land in said outer vessel, the surrounding wall of said outer vessel being of substantially less girth below said recess than above it due to said recess, said inner vessel having flange means supportable upon said land.

3. The invention according to claim 2 in which said flange means enclose substantially equal areas substantially on the planes of both ends of said inner vessel, said detachably connecting means co-acting between said flange means and outer vessel for locking said inner vessel to said outer vessel.

4. The invention according to claim 3 in which said inner vessel is predominantly exterio-convexly conical.

5. A non boil-over cooking assembly for liquids and particularly ingestible liquids characterized by at least including, in combination, an outer open-topped vessel means having a floor and surrounding wall, and inner vessel means having opposite ends, each including a mouth, the mouth of one of said ends being substantially smaller in area than the mouth of the opposite end, and means for detachably connecting said inner vessel to said outer vessel on the plane of the end thereof which has the larger of said mouths, said end being sufficiently spaced from and in a plane above a source of heat to permit liquid circulating between said floor and the adjacent end of said vessel to rise within said inner vessel and fall within said outer vessel, and closure means for the smaller of said mouths.

6. The invention according to claim 5 in which said means for supporting one end of said inner vessel spaced from said source of heat consists of a surrounding in-stepped external recess formed in said wall near said floor to provide an interior land in said outer vessel, the surrounding wall of said outer vessel being of substantially less girth below said recess than above it due to said recess, said inner vessel having flange means supportable upon said land.

7. The invention according to claim 6 in which said flange means enclose substantially equal areas substantially on the planes of both said ends of said inner vessel, said means for supporting co-acting between said flange means and outer vessel for locking said inner vessel to said outer vessel.

* * * * *